US011290928B1

(12) United States Patent
Vivanco et al.

(10) Patent No.: US 11,290,928 B1
(45) Date of Patent: Mar. 29, 2022

(54) METHODS, SYSTEMS, AND DEVICES FOR ENHANCING AUTOMATIC NEIGHBOR RELATIONS OVER A NETWORK SUPPORTING DUAL CONNECTIVITY

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Mikolaj Stawiarski, Carpentersville, IL (US)

(73) Assignees: AT&T Intellectual Property I, L.P., Atlanta, GA (US); AT&T Technical Services Company, Inc., Vienna, VA (US)

(*) Notice: Subject to any disclaimer, the term of this patent is extended or adjusted under 35 U.S.C. 154(b) by 0 days.

(21) Appl. No.: 16/952,549

(22) Filed: Nov. 19, 2020

(51) Int. Cl.
*H04W 36/00* (2009.01)
*H04W 36/30* (2009.01)
*H04W 36/08* (2009.01)

(52) U.S. Cl.
CPC ....... *H04W 36/0069* (2018.08); *H04W 36/08* (2013.01); *H04W 36/30* (2013.01)

(58) Field of Classification Search
CPC ......... H04W 36/0083; H04W 36/0069; H04W 36/0085; H04W 36/00; H04W 36/30; H04W 36/06; H04W 36/08
See application file for complete search history.

(56) References Cited

U.S. PATENT DOCUMENTS

| | | | |
|---|---|---|---|
| 2009/0047961 A1* | 2/2009 | Kim | H04W 36/0085 455/436 |
| 2011/0039520 A1* | 2/2011 | Maida | H04W 36/0061 455/411 |
| 2015/0092552 A1* | 4/2015 | Bajj | H04W 84/18 370/235 |
| 2016/0234734 A1* | 8/2016 | Chaudhuri | H04W 36/00835 |
| 2017/0188285 A1* | 6/2017 | Moon | H04L 5/0035 |
| 2018/0049214 A1* | 2/2018 | Kubota | H04W 36/32 |
| 2019/0007917 A1* | 1/2019 | Olofsson | H04W 56/0015 |
| 2019/0082438 A1* | 3/2019 | John Wilson | H04B 7/0408 |

OTHER PUBLICATIONS

"5G—Part 3—Dual Connectivity (EN-DC)", 3 pages, Sep. 30, 2017.

* cited by examiner

*Primary Examiner* — Allahyar Kasraian
(74) *Attorney, Agent, or Firm* — Guntin & Gust, PLC; Kenneth Kwan

(57) ABSTRACT

Aspects of the subject disclosure may include, for example, obtaining, from a user equipment, data relating to the user equipment, where the user equipment is communicatively coupled to a source network node, accessing a neighbor list that identifies a first pairing of first and second network nodes and a second pairing of third and fourth network nodes, and that associates a first weighting factor with the first pairing and a second weighting factor with the second pairing, selecting the first network node or the third network node as a target network node in a handover for the user equipment based on the data, the first weighting factor, and the second weighting factor, and causing the handover to be effected for the user equipment responsive to the selecting the first network node or the third network node as the target network node. Other embodiments are disclosed.

20 Claims, 12 Drawing Sheets

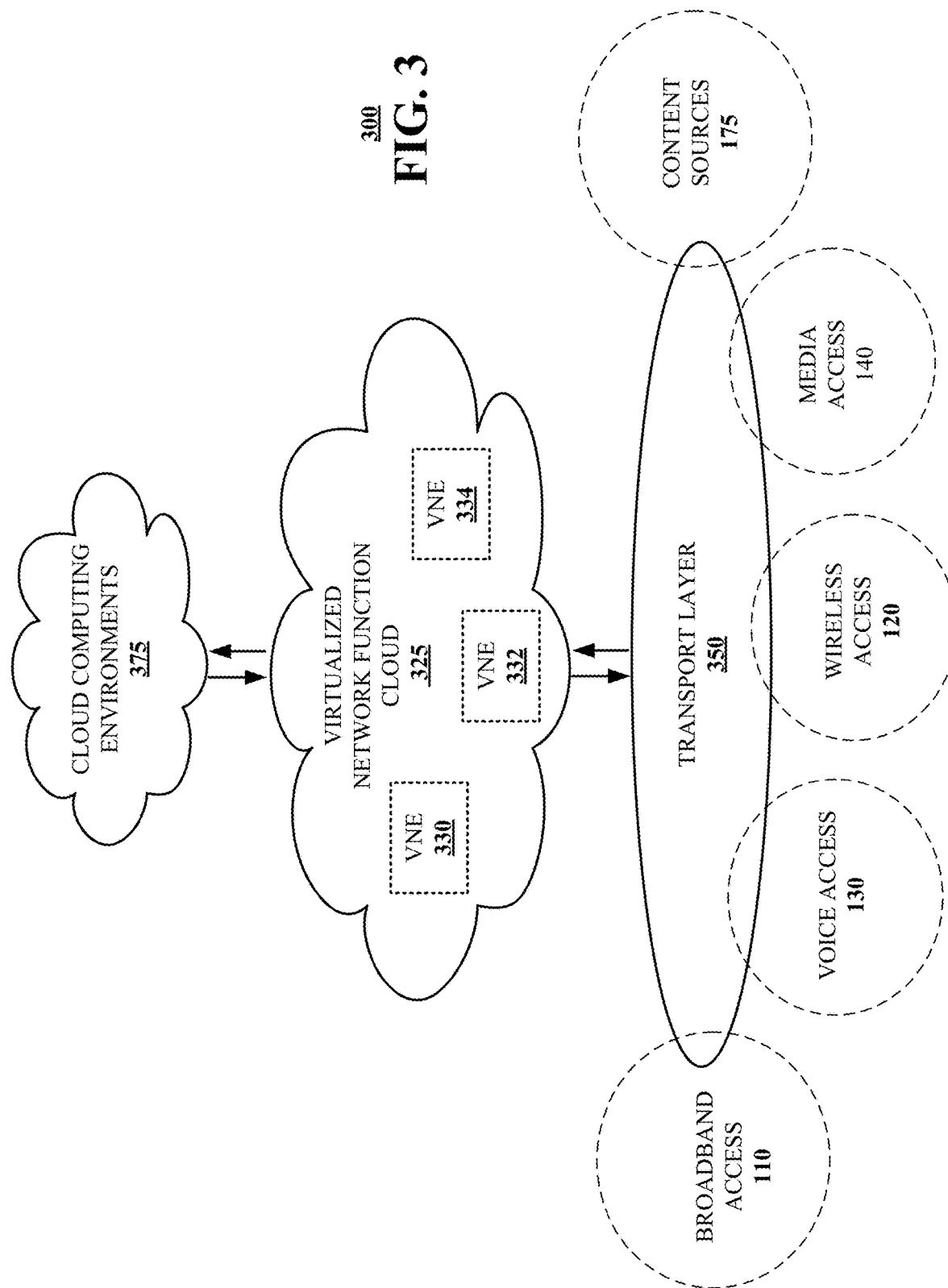

METHODS, SYSTEMS, AND DEVICES FOR ENHANCING AUTOMATIC NEIGHBOR RELATIONS OVER A NETWORK SUPPORTING DUAL CONNECTIVITY

FIELD OF THE DISCLOSURE

The subject disclosure relates to enhancing automatic neighbor relations (ANR) over a network that supports dual connectivity (e.g., E-UTRAN New Radio (NR) Dual Connectivity (EN-DC)).

BACKGROUND

ANR is a self-optimization function for dynamic and automatic, real-time building and maintenance of neighbor lists (NLs) for a cell, without user intervention. ANR constantly maintains neighbor lists for a cell by identifying unaccounted-for neighbors based on user equipment (UE) reports on signal strengths of nearby cells, which facilitates handovers (HOs) and reduces dropped call rates that might occur due to missing neighbor relations, and simplifies handling of neighbor relations when new network nodes (e.g., eNodeBs (eNB s), gNodeBs (gNBs), etc.) are added to a network. ANR is useful in network roll-outs where sites are launched one at a time, since the function automatically adapts to the changing network topology.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1A:
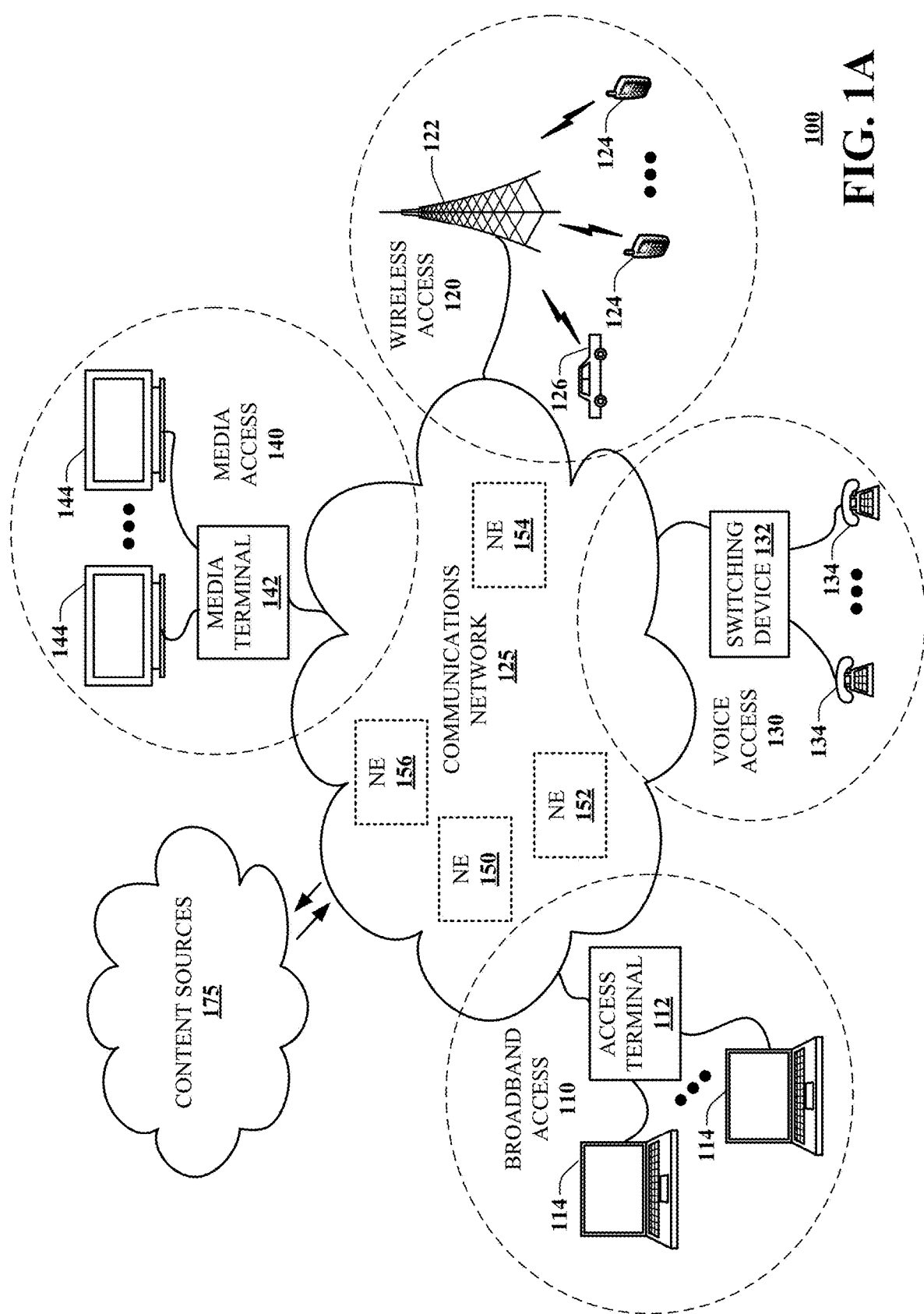
FIG. 1A is a block diagram illustrating an exemplary, non-limiting embodiment of a communication network or system in accordance with various aspects described herein.

The subject disclosure describes, among other things, illustrative embodiments for a system that is capable of providing an enhanced ANR functionality in a network operable in a dual connectivity mode (e.g., EN-DC). In exemplary embodiments, the system is capable of determining a weighting factor for a pairing of a network node that employs a first radio access technology (e.g., an eNB) and a network node that employs a second radio access technology (e.g., a gNB) (e.g., pairing also referred to as cell relation), based on data relating to a user equipment (e.g., movement of the user equipment, network resource demand of the user equipment, and/or the like) and metrics relating to the pair of network nodes (e.g., network node capabilities (e.g., support for dual connectivity, etc.), available network resources, coverage range(s), frequency range(s), and/or the like). In various embodiments, the system is capable of managing a mapping of neighbor relations in a neighbor list of a network node based on multiple of such weighting factors and corresponding pairings of network nodes to enable selections of handover target network nodes (e.g., intelligent decisions on handover targets) that are likely to provide suitable dual connectivity coverage for the user equipment.

Determining weighting factors and managing neighbor lists that include such weighting factors, as described herein, enables improved or optimized selections of handover targets for user equipment, which reduces a quantity of handovers (and/or cell additions) that need to be performed across a network. This improves overall user experience, and conserves computing resources and network resources, which also improves overall network performance.

Other embodiments are described in the subject disclosure.

One or more aspects of the subject disclosure include a device, comprising a processing system including a processor, and a memory that stores executable instructions that, when executed by the processing system, facilitate performance of operations. The operations can include obtaining data relating to a user equipment, where the user equipment is communicatively coupled to a source network node of a network, and where a handover to a target network node of the network is to be performed for the user equipment. Further, the operations can include monitoring, after the handover is performed for the user equipment, an activity between the user equipment and the target network node, determining, based on the monitoring, whether dual connectivity, involving a secondary network node, is established for the user equipment, and obtaining, responsive to determining that dual connectivity is established for the user equipment, metrics relating to the secondary network node. Further, the operations can include determining a weighting factor for a pairing of the target network node and the secondary network node based on the metrics and the data relating to the user equipment, and causing the source network node to define, in a neighbor list, a relationship between the target network node and the secondary network node, and associate the relationship with the weighting factor, where the weighting factor enables the source network node to determine whether the target network node is an optimal handover target for the user equipment or other user equipment.

One or more aspects of the subject disclosure include a non-transitory machine-readable storage device, comprising executable instructions that, when executed by a processing system including a processor, facilitate performance of operations. The operations can include receiving data relating to a user equipment, where the user equipment is communicatively coupled to a source network node of a network, where a handover is to be performed for the user equipment, and where the source network node has access to a neighbor list that identifies a first pairing of a first network node of the network and a second network node of the network and a second pairing of a third network node of the network and a fourth network node of the network, and that associates a first weighting factor with the first pairing and a second weighting factor with the second pairing. Further, the operations can include controlling selection of a target network node for the handover based on the data relating to the user equipment, the first weighting factor, and the second weighting factor, where the controlling the selection of the target network node results in a selection of the first network node as the target network node for the handover. Further, the operations can include monitoring an activity between the user equipment and the second network node after the handover to the first network node is performed, obtaining, based on the monitoring, metrics relating to the second network node, and adjusting the first weighting factor based on the metrics and the data relating to the user equipment, where the adjusting the first weighting factor enables the source network node to determine whether the first network node is an optimal handover target for the user equipment or other user equipment.

One or more aspects of the subject disclosure include a method. The method can comprise obtaining, by a processing system including a processor, and from a user equipment, data relating to the user equipment, where the processing system is included in a source network node of a network, where the user equipment is communicatively coupled to the source network node. Further, the method can include accessing, by the processing system, a neighbor list that identifies a first pairing of a first network node of the network and a second network node of the network and a second pairing of a third network node of the network and a fourth network node of the network, and that associates a first weighting factor with the first pairing and a second weighting factor with the second pairing. Further, the method can include selecting, by the processing system, one of the first network node and the third network node as a target network node in a handover for the user equipment based on the data relating to the user equipment, the first weighting factor, and the second weighting factor, and causing the handover to be effected for the user equipment responsive to the selecting the one of the first network node and the third network node as the target network node.

Referring now to FIG. 1A, a block diagram is shown illustrating an example, non-limiting embodiment of a communication network or system 100 in accordance with various aspects described herein. For example, the system 100 can facilitate in whole or in part enabling selection of a handover target network node for a user equipment, that is likely to result in suitable dual connectivity coverage for the user equipment, based on data relating to the user equipment (e.g., movement of the user equipment, network resource demand of the user equipment, and/or the like) and metrics relating to network node pairs (e.g., pairs that each includes an LTE-based network node and an NR-based network node) and network node capabilities (e.g., dual connectivity support, coverage range(s), operative frequency range(s), and/or the like). In particular, a communication network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communication network 125 includes a plurality of network elements (NE) 150, 152, 154, 156, etc. for facilitating the broadband access 110, wireless access 120, voice access 130, media access 140 and/or the distribution of content from content sources 175. The communication network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communication network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communication network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1B:
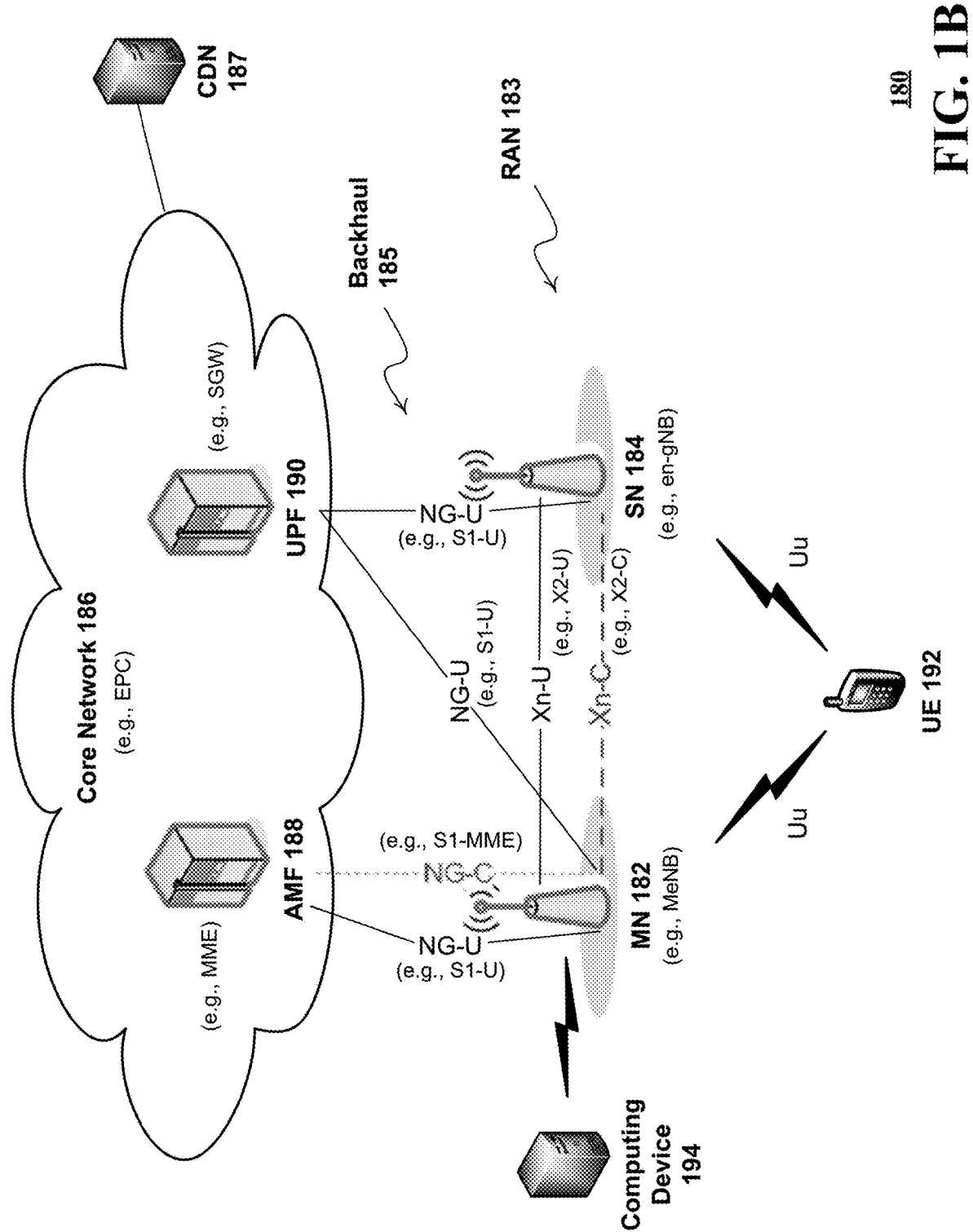
FIG. 1B is a block diagram illustrating an example non-limiting embodiment of a communication network or system functioning within or in conjunction with the system of FIG. 1A in accordance with various aspects described herein.

Referring now to FIG. 1B, a block diagram is shown illustrating an example non-limiting embodiment of a communication network (or system) 180 functioning within or in conjunction with the system 100 of FIG. 1A in accordance with various aspects described herein. Communication network 180 can be configured to provide Multi-Radio Dual Connectivity (MR-DC) via a radio access network (RAN) 183 that includes one or more network nodes (e.g., access points, such as base stations or the like). In one example, RAN 183 can include a master node (MN) 182 and a secondary node (SN) 184. In one example, each of MN 182 and SN 184 can employ a different radio access technology (RAT). A user equipment (UE) 192 can be equipped with multiple transmitter (Tx) devices and/or multiple receiver (Rx) devices configured to communicate with, and utilize network resources provided via, the MN 182 and the SN 184. The MN 182 and/or the SN 184 can be operated with shared spectrum channel access.

One or more of the nodes 182, 184 of the RAN 183 can be in communication with a mobility core network 186 via a backhaul network 185. The core network 186 can be in further communication with one or more other networks (e.g., one or more content delivery networks (one of which, CDN 187 is shown)), one or more services and/or one or more devices. The core network 186 can include various network devices and/or systems that provide a variety of functions, such as mobility management, session management, data management, user plane and/or control plane function(s), policy control function(s), and/or the like. As shown in FIG. 1B, the core network 186 can include an Access Mobility and Management Function (AMF) 188 configured to facilitate mobility management in a control plane of the communication network 180, and a User Plane Function (UPF) 190 configured to provide access to a data network, such as a packet data network (PDN), in a user (or data) plane of the communication network 180. The AMF 188 and the UPF 190 can each be implemented in one or more computing devices (e.g., one or more server devices or the like). In some embodiments, the core network 186 can additionally, or alternatively, include one or more devices implementing other functions, such as a master user database server device for network access management, a PDN gateway server device for facilitating access to a PDN, a Unified Data Management (UDM) function, a Session Management Function (SMF), a Policy Control Function (PCF), and/or the like.

The MN 182 and the SN 184 can be communicatively coupled to one another via an Xn-C interface configured to facilitate control plane traffic between the MN 182 and the SN 184, and can also be communicatively coupled to one another via an Xn-U interface configured to facilitate user plane traffic between the MN 182 and the SN 184.

The AMF 188 can be communicatively coupled to the MN 182 via an NG-C interface in the control plane. In some embodiments, the AMF 188 can additionally, or alternatively, be communicatively coupled to the SN 184 via a similar interface in the control plane. The UPF 190 can be communicatively coupled to the MN 182 via an NG-U interface in the user plane, and can be communicatively coupled to the SN 184 via a similar NG-U interface in the user plane.

Each of the MN 182 and the SN 184 can include a radio resource control (RRC) entity capable of exchanging network traffic (e.g., protocol data units (PDUs)) with the UE 192. In some embodiments, the UE 192 can communicate with the MN 182 via a Uu radio interface in an RRC protocol layer of the control plane. In some embodiments, the UE 192 can have a single RRC state, such as a single control plane connection with the core network 186 based on the RRC entity of the MN 182. In some embodiments, the MN 182 can facilitate control plane communications between the SN 184 and the UE 192 by, for example, transporting RRC PDUs, originating from the SN 184, to the UE 192.

The communication network 180 can provide multiple bearer types in the data plane. For example, the bearer types can include a Master Cell Group (MCG) bearer type, a Secondary Cell Group (SCG) bearer type, and a split bearer type. Depending on the RATs employed by the MN 182 and the SN 184, various packet data convergence protocol (PDCP) configurations can be implemented for the different bearer types. Thus, in various embodiments, each bearer type (e.g., the MCG bearer type, the SCG bearer type, and the split bearer type) can be terminated either in the MN 182 or in the SN 184.

In some embodiments, the communication network 180 can be configured to provide dual connectivity according to an E-UTRAN New Radio (NR) Dual Connectivity (EN-DC) configuration. In some embodiments, the EN-DC configuration can provide a 5G Non-Standalone (NSA) implementation. In one example (related to a 5G NSA implementation), an LTE radio and the core network 186 can be utilized as an anchor for mobility management and coverage for an additional 5G (or NR) carrier. Network traffic can be split in a variety of manners, such as across LTE and NR at an eNodeB, at the core network 186, and/or at an NR cell.

In embodiments in which the communication network 180 is configured to provide the EN-DC configuration, the MN 182 can include a master eNodeB (MeNB) that provides E-UTRAN access, and the SN 184 can include an en-gNodeB (en-gNB) that provides NR access. The core network 186 can be (or can include) an evolved packet core (EPC), where the AMF 188 is implemented as a mobility management entity (MME) and the UPF 190 is implemented as a serving gateway (SGW). The core network 186 can include one or more devices that implement one or more functions, such as a Home Subscriber Server (HSS) for managing user access, a PDN gateway server device for facilitating access to a PDN, and/or the like.

In an EN-DC configuration, the MN (MeNB) 182 and the SN (en-gNB) 184 can be communicatively coupled to one another via an X2-C interface in the control plane, and via an X2-U interface in the user plane. The AMF (MME) 188 can be communicatively coupled to the MN (MeNB) 182 via an S1-MME interface in the control plane. In some embodiments, the AMF (MME) 188 can additionally, or alternatively, be communicatively coupled to the SN (en-gNB) 184 via a similar interface in the control plane. The UPF (SGW) 190 can be communicatively coupled to the MN (MeNB) 182 via an S1-U interface in the user plane, and can also be communicatively coupled to the SN (en-gNB) 184 via a similar S1-U interface in the user plane, to facilitate data transfer for the UE 192.

In the EN-DC configuration, the MeNB can include an E-UTRA version of an RRC entity and the en-gNB can include an NR version of an RRC entity. Additionally, in the EN-DC configuration, an E-UTRA PDCP or an NR PDCP can be configured for MeNB terminated MCG bearer types, and an NR PDCP can be configured for all other bearer types.

In some embodiments of the EN-DC configuration, the AMF (MME) 188 can communicate exclusively with the MN (MeNB) 182, but both the MeNB and the en-gNB can access the core network (e.g., EPC) 186. In various embodiments, data traffic can be split between the LTE and NR RATs 182, 184, but where the MN (MeNB) 182 maintains sole control of the dual connectivity mode of the communication network 180. The UE 192 can access the core network (e.g., EPC) 186 by establishing a connection with the MN (MeNB) 182. If the UE 192 supports EN-DC and is capable of communicating in the NR band (e.g., if the UE 192 includes an LTE communication unit, such as an LTE Rx/Tx radio and protocol stack, and an NR communication unit, such as an NR Rx/Tx radio and protocol stack), the MN (MeNB) 182 can instruct the UE 192 to obtain measurements of, and provide measurement report(s) on, the NR band. In a case where the UE 192 identifies a candidate network node in the NR band, such as the SN (en-gNB) 184, the MN (MeNB) 182 can communicate one or more parameters to the en-gNB (e.g., via the X2-C interface) to enable the en-gNB to establish a connection with the UE 192. Upon establishing such a connection, the MN (MeNB) 182 can then forward a portion of any incoming user data, directed for the UE 192, to the SN (en-gNB) 184 for transmission to the UE 192, thereby enabling the UE 192 to simultaneously communicate over LTE and NR to achieve increased data rates. In some embodiments, the MN (MeNB) 182 can request, or otherwise, instruct, the UPF (SGW) 190 to exchange user data directly with the SN (en-gNB) 184. In such embodiments, the en-gNB can similarly forward a portion of any incoming user data, directed for the UE 192, to the MeNB for transmission to the UE 192.

As shown in FIG. 1B, the communication network 180 can include a computing device 194 communicatively coupled with the MN 182. The computing device 194 can include one or more devices, such as server device(s), configured to provide one or more functions or capabilities, such as dual connectivity control functions, edge computing functions and/or capabilities, provisioning of data and/or services for user equipment (e.g., such as UE 192), data analytics function(s), machine learning and/or artificial intelligence function(s) that provide resource management capabilities (e.g., mobility management, admission control, interference management, etc.), automatic planning functions, configuration functions, optimization functions, diagnostic functions, healing functions, and/or the like. For example, in some implementations, the computing device 194 can include, or be implemented in, a multi-access edge computing (MEC) device or device(s), a RAN Intelligent Controller (RIC), a Self-Organizing Network (SON), and/or the like. In some embodiments, such as in a case where the core network 186 includes an EPC, the computing device 194 can include, or be implemented in, an MME, an SGW, and/or the like.

It is to be understood and appreciated that the quantity and arrangement of nodes, devices, and networks shown in FIG. 1B are provided as an example. In practice, there may be additional nodes, devices, and/or networks, fewer nodes, devices, and/or networks, different nodes, devices, and/or networks, or differently arranged nodes, devices, and/or networks than those shown in FIG. 1B. For example, the communication network 180 can include more or fewer MNs 182, SNs 184, AMF device(s) 188, UPF device(s) 190, UE's 192, computing devices 194, core networks 186, etc. Furthermore, two or more nodes or devices shown in FIG. 1B may be implemented within a single node or device, or a single node or device shown in FIG. 1B may be implemented as multiple, distributed nodes or devices. Additionally, or alternatively, a set of nodes or devices (e.g., one or more nodes or devices) of the communication network 180 may perform one or more functions described as being performed by another set of nodes or devices of the communication network 180.

Figure 2A:
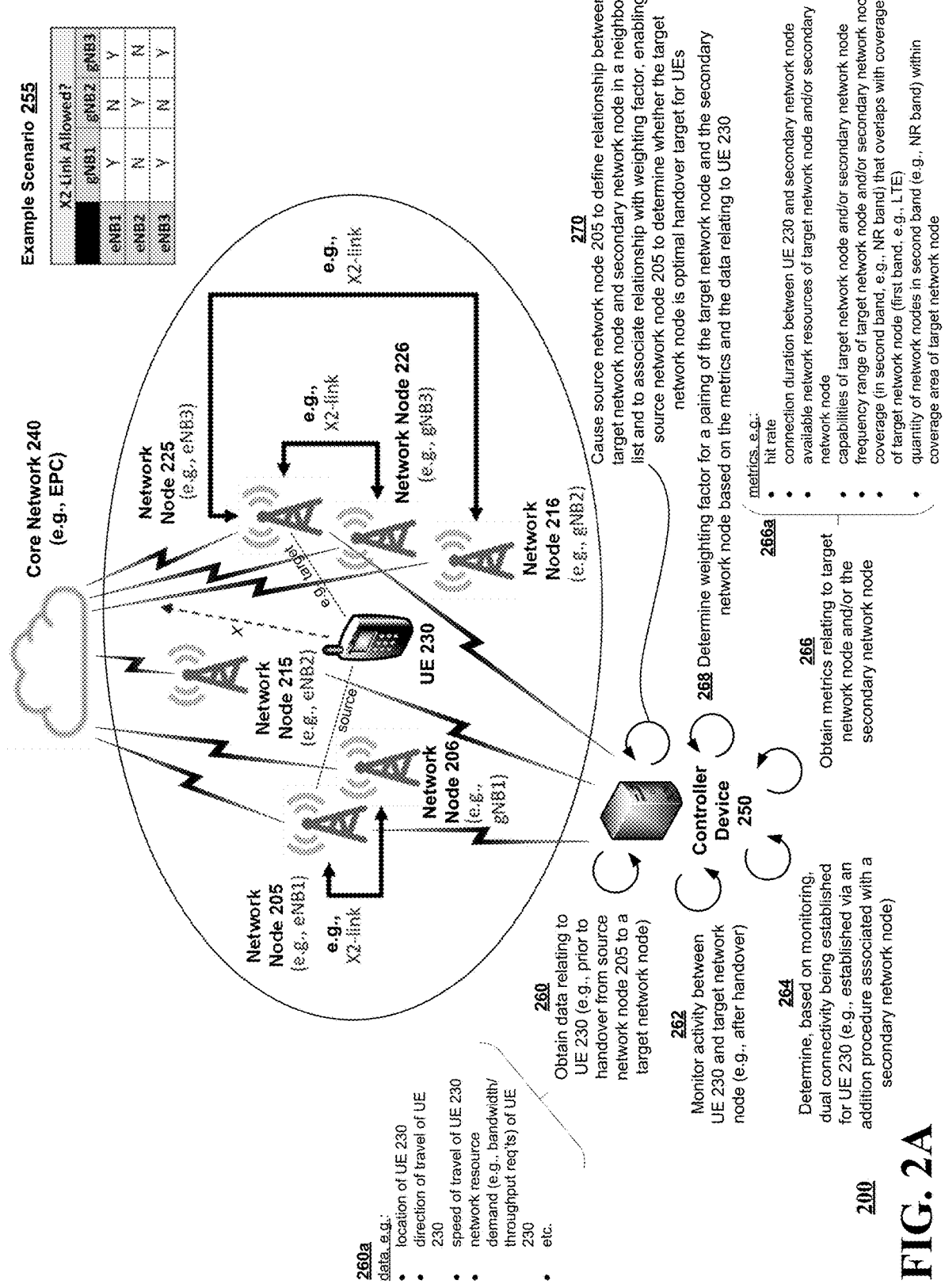
FIGS. 2A and 2B are block diagrams illustrating an example, non-limiting embodiment of a system functioning within or in conjunction with the system of FIG. 1A and/or the system of FIG. 1B in accordance with various aspects described herein.
Figure 2B:
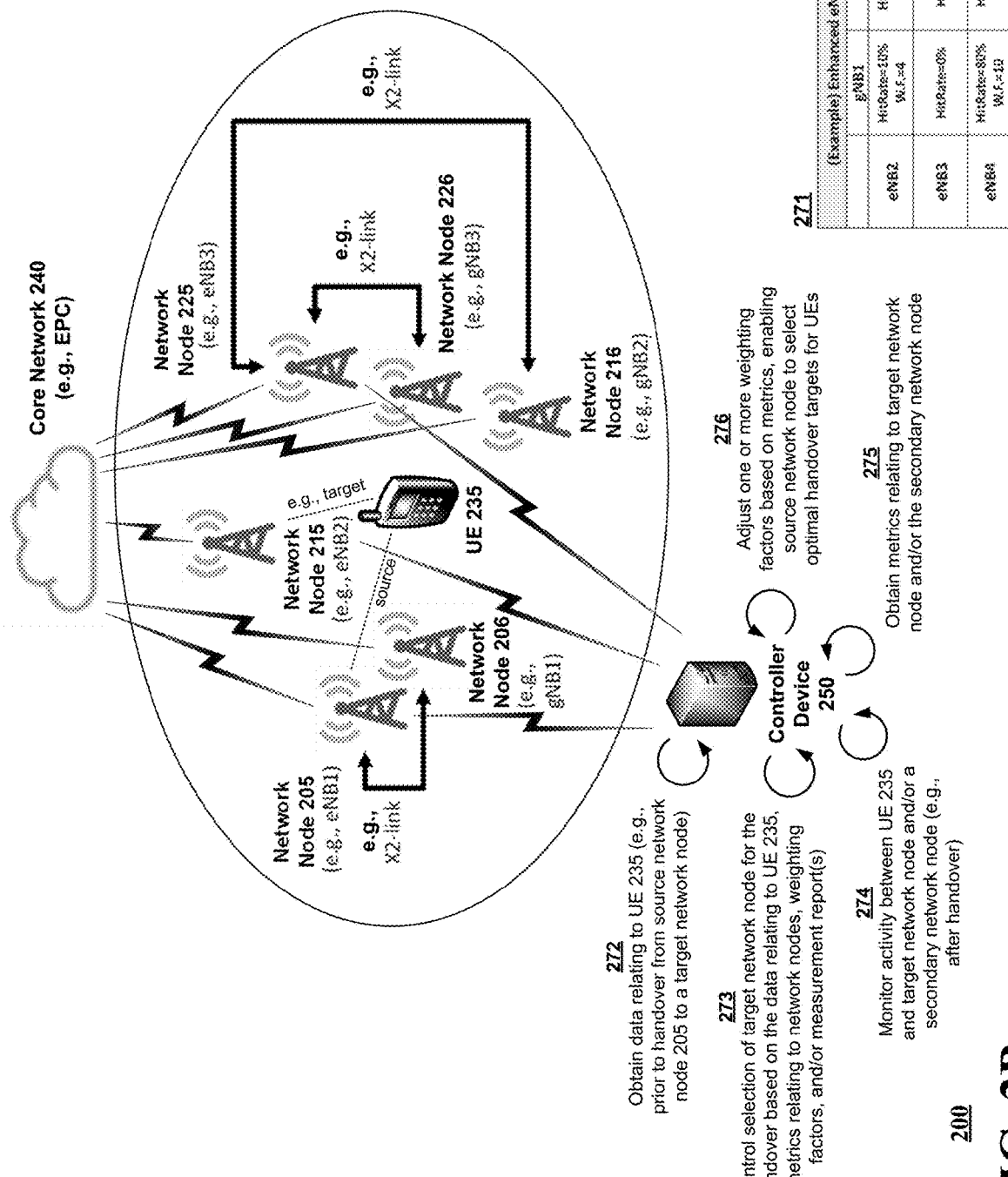

FIGS. 2A and 2B are block diagrams illustrating an example, non-limiting embodiment of a system (e.g., a network system) 200 that is configured to provide an enhanced ANR functionality. In various embodiments, the enhanced ANR functionality enables selection of a handover target network node for a user equipment, that is likely to result in suitable dual connectivity coverage for the user equipment, based on data relating to the user equipment (e.g., movement of the user equipment, network resource demand of the user equipment, and/or the like) and metrics relating to network node pairs (e.g., pairs that each includes an LTE-based network node and an NR-based network node) and network node capabilities (e.g., dual connectivity support, coverage range(s), operative frequency range(s), and/or the like). The network system 200 can function in, or in conjunction with, various communication systems and/or networks including the system 100 of FIG. 1A and/or the communication network 180 of FIG. 1B in accordance with various aspects described herein.

As shown in each of FIGS. 2A and 2B, the network system 200 can include network nodes 205, 215, and 225 (e.g., access points, such as base stations or the like) that each employs a first radio access technology (e.g., LTE or a higher generation wireless technology), and network nodes 206, 216, and 226 (e.g., access points, such as base stations or the like) that each employs a second radio access technology (e.g., 5G or a higher generation wireless technology). The network nodes 205, 206, 215, 216, 225, and 226 can form, or be a part of, a radio access network (RAN) that facilitates communications between a core network 240 and user equipment, such as a user equipment 230 (FIG. 2A) and/or a user equipment 235 (FIG. 2B). Each of the user equipment 230 and 235 can include, for example, one or more data terminals 114, one or more mobile devices 124, one or more vehicles 126, one or more display devices 144, or one or more other client devices.

In some embodiments, the RAN can be configured for EN-DC. For example, each of the network nodes 205, 215, and 225 can include an eNB (e.g., a Master eNB, or MeNB), each of the network nodes 206, 216, and 226 can include a gNB (e.g., a secondary NB, or SgNB or gNB), and the core network 140 can include an evolved packet core (EPC), where the network nodes 205, 215, or 225 can communicatively couple with one another and/or with one or more of the network nodes 206, 216, and 226 in one or more primary cell (Pcell)/secondary cell (Scell) configurations to provide dual connectivity for user equipment, such as the user equipment 230 and/or 235. In various embodiments, the network system 200 can include various quantities of cells (e.g., Pcells and/or Scells), various quantities of network nodes in a cell, and/or various types of network nodes and/or cells.

As shown in each of FIGS. 2A and 2B, the network system 200 can include a controller device 250 that is communicatively coupled to the network nodes 205, 215, and 225. In various embodiments, the controller device 250 can be communicatively coupled to all of the network nodes (e.g., including the network nodes 206, 216, and 226). In various embodiments, the controller device 250 can include, or otherwise correspond to, the computing device 194 of FIG. 1B. In various embodiments, the controller device 250 can be implemented in a centralized network hub or node device at, or proximate to, an edge of a network provider's (e.g., a cellular network provider's) overall network. In some embodiments, the controller device 250 can be implemented in a multi-access edge computing (MEC) device or devices. As the name/nomenclature implies, a MEC device may reside at a location that is at, or proximate, to an edge of the network system 200, which may be useful in reducing (e g, minimizing) delays associated with provisioning of data or services to one or more (requesting) devices. In some embodiments, the controller device 250 can additionally, or alternatively, be implemented in a Self-Organizing Network (SON) or other similar network that provides automatic planning functions, configuration functions, optimization functions, diagnostic functions, and/or healing functions for a network. In some embodiments, the controller device 250 can additionally, or alternatively, be implemented in a RAN Intelligent Controller (RIC) or other similar device or device(s) that leverages data analytics and machine learning and/or artificial intelligence to provide resource management capabilities, such as mobility management, admission control, and interference management, at an edge of a network. In various embodiments, the controller device 250 can be communicatively coupled to the core network 240. In various embodiments, the controller device 250 may be implemented in one or more devices included in the core network 240. For example, in a case where the core network 240 includes an EPC, the controller device 250 can include, or be implemented, in a mobility management entity (MME) gateway, a serving gateway (SGW), and/or the like.

In various embodiments, the network system 200 can employ ANR functionality that enables a network node, such as network node 205, 215, or 225 to discover, or otherwise identify, neighboring network nodes or cells, create and maintain a neighbor list of neighbor relations, and monitor and/or track, for some or all of the neighbor relations, such as for each neighbor relation, a rate (e.g., a hit rate or the like) at which user equipment (and/or the network node) have selected that neighbor relation for a handover, which may be useful for network design and optimization. In some embodiments, the ANR functionality can associate priority levels with neighbor relations, which traffic management mechanisms can leverage for traffic offloading purposes.

In some embodiments, in a case where a user equipment discovers, or otherwise identifies, one or more neighboring network nodes (or cells) and provides information regarding the neighboring cell(s) to a serving cell, the serving cell (or a network node thereof) can establish a connection with one or more of the neighboring cells to facilitate handovers and/or provision of dual connectivity. Referring to FIG. 2A, for example, in a case where the network system 200 is configured for EN-DC, where the network node 205 is serving the user equipment 230, and where the user equipment 230 identifies, and provides information regarding, neighboring network nodes 206, 215, 216, 225, and/or 226 to the network node 205, the network node 205 can establish a connection (e.g., over one or more X2 interfaces) with one or more of such neighboring network nodes to facilitate handovers and/or provision of dual connectivity.

The overall network topology of a network configured to support dual connectivity, such as the network system 200, may change as new cells (e.g., NR cells) are added to the network and as network nodes (e.g., eNBs) update—for example, either based on user input or via ANR as part of processing user equipment handover requests—respective neighbor lists with newly-discovered neighboring network nodes (e.g., gNBs and/or other eNBs). In identifying, by a source network node (e.g., an eNB), a candidate target network node for a handover, neither the user equipment nor the source network node may have access to information that allows the user equipment or the source network node to predict whether a quality of dual connectivity coverage would be sufficient or suitable for the user equipment after the handover, or whether dual connectivity would even be possible at all after the handover. For example, a target eNB and/or an associated gNB may have insufficient network resources (e.g., limited bandwidth) relative to the user equipment's network resource demand, a target eNB may lack support for dual connectivity altogether, a target eNB may be constrained to operate in the dual connectivity mode only with a particular gNB (e.g., an operator of the network may have set restrictions preventing certain eNB s from establishing connections with certain gNBs (e.g., via blacklisting of a relation between an eNB and a gNB by identifier (ID) or the like)), where the particular gNB's operative frequency range provides only limited coverage relative to a direction of travel of the user equipment (e.g., gNBs may operate in different frequency ranges, such as millimeter-wave (MW), less than 6 gigahertz (GHz), etc. and/or at different bandwidths, such as 5 megahertz (MHz), 20 MHz, etc.), etc. Lacking knowledge of some or all of the foregoing can result in a handover that ultimately proves futile, or otherwise ineffective, for the user equipment, and may require one or more additional handovers to be performed for the user equipment until suitable dual connectivity is attained.

As an example, and referring to FIG. 2A, assume that the network node 205 (e.g., eNB1) is serving the user equipment 230 as a source network node, and the user equipment 230 is located within coverage ranges of neighboring network nodes 215 (e.g., eNB2), 225 (e.g., eNB3), 206 (e.g., gNB1), 216 (e.g., gNB2), and 226 (gNB3). The user equipment 230 can perform measurements relating to the neighboring network nodes (e.g., measurements of signal strengths thereof) and provide corresponding measurement reports to the network node 205 (e.g., eNB1), which the network node 205 (e.g., eNB1) can use to create and/or update a neighbor list as well as to facilitate a handover for the user equipment. Continuing with the example, in a case where the user equipment 230 travels in a direction X toward an edge of a coverage range of the network node 205 (e.g., eNB1), thus necessitating a handover, either the network node 215 (e.g., eNB2) or the network node 225 (e.g., eNB3) may be selected for the handover. If the network node 215 (e.g., eNB2) is selected for the handover, if the network node 215 (e.g., eNB2) is constrained to operate only with the network node 216 (e.g., gNB2) in the dual connectivity mode (e.g., per example scenario 255), and if the network node 216 (e.g., gNB2) operates in a MW frequency range (where the user equipment 230 is likely to move out of a coverage range of the network node 216 should the user equipment 230 continue traveling in the direction X), the user equipment 230 may experience poor dual connectivity coverage after the handover to the network node 215, and a subsequent handover may need to be performed for the user equipment 230. Conversely, if the network node 225 (e.g., eNB3) is selected for the handover, and if the network node 225 (e.g., eNB3) can operate with either the network node 206 (e.g., gNB1) or 226 (e.g., gNB3) in the dual connectivity mode (e.g., per example scenario 255), where the network node 226 (e.g., gNB3) is equipped to provide sufficient coverage for the user equipment 230 even as the user equipment 230 continues to travel in the direction X, then the user equipment 230 may experience suitable dual connectivity coverage.

In various embodiments, the network system 200—e.g., the controller device 250—is capable of providing an enhanced ANR functionality that improves or optimizes selection of handover target network nodes for user equipment based on the target network nodes' and/or associated secondary network nodes' capabilities and/or available network resources as well as based on user equipment requirements and/or conditions.

As shown in FIG. 2A, and as shown by reference number 260, the controller device 250 can obtain data relating to the user equipment 230. In various embodiments, the controller device 250 can obtain the data prior to a handover being effected for the user equipment 230. For example, the network node 205 may be serving the user equipment 230 as a source network node, where the user equipment 230 may desire a handover to a target network node (e.g., one of the network nodes 215 and 225). Continuing with the example, the controller device 250 can obtain the data relating to the user equipment 230 prior to the handover from the source network node 205 to the target network node. In various embodiments, the controller device 250 can obtain the data relating to the user equipment 230 within a threshold time prior to the handover (e.g., based on monitoring timings of communications between the user equipment 230 and the network node 205 relating to a handover, communications between the network node 205 and a management system (e.g., an MME), and/or the like).

In various embodiments, and as shown by reference number 260*a*, the data relating to the user equipment 230 can include information identifying, or usable to identify, movement of the user equipment 230 (e.g., a current location of the user equipment 230, a direction of travel of the user equipment 230, a speed of travel of the user equipment 230, and/or the like), network resource demand of (or usage by) the user equipment 230, capabilities of the user equipment 230 (e.g., whether the user equipment 230 supports dual connectivity, such as EN-DC, etc.), and/or the like. In various embodiments, the data relating to the user equipment 230 can include measurement report(s) (e.g., concerning signal strength(s) of nearby network nodes, such as the network nodes 215 and/or 225) provided by the user equipment 230 to one or more network nodes, such as the source network node 205.

As shown by reference numbers 262 and 264, the controller device 250 can monitor an activity between the user equipment 230 and the target network node (e.g., the network node 205), and determine, based on the monitoring, whether dual connectivity is being established for the user equipment 230. In various embodiments, the controller device 250 can monitor the activity after a handover is performed for the user equipment 230 to the target network node. In some embodiments, the controller device 250 can monitor the activity and/or determine whether dual connectivity is being established for the user equipment 230, based on information provided by the target network node, information provided by the user equipment 230, information provided by another network node (e.g., the source network node 205 and/or another network node of the network system 200), information provided by a management system included in the core network 240, and/or the like.

Figure 2C:
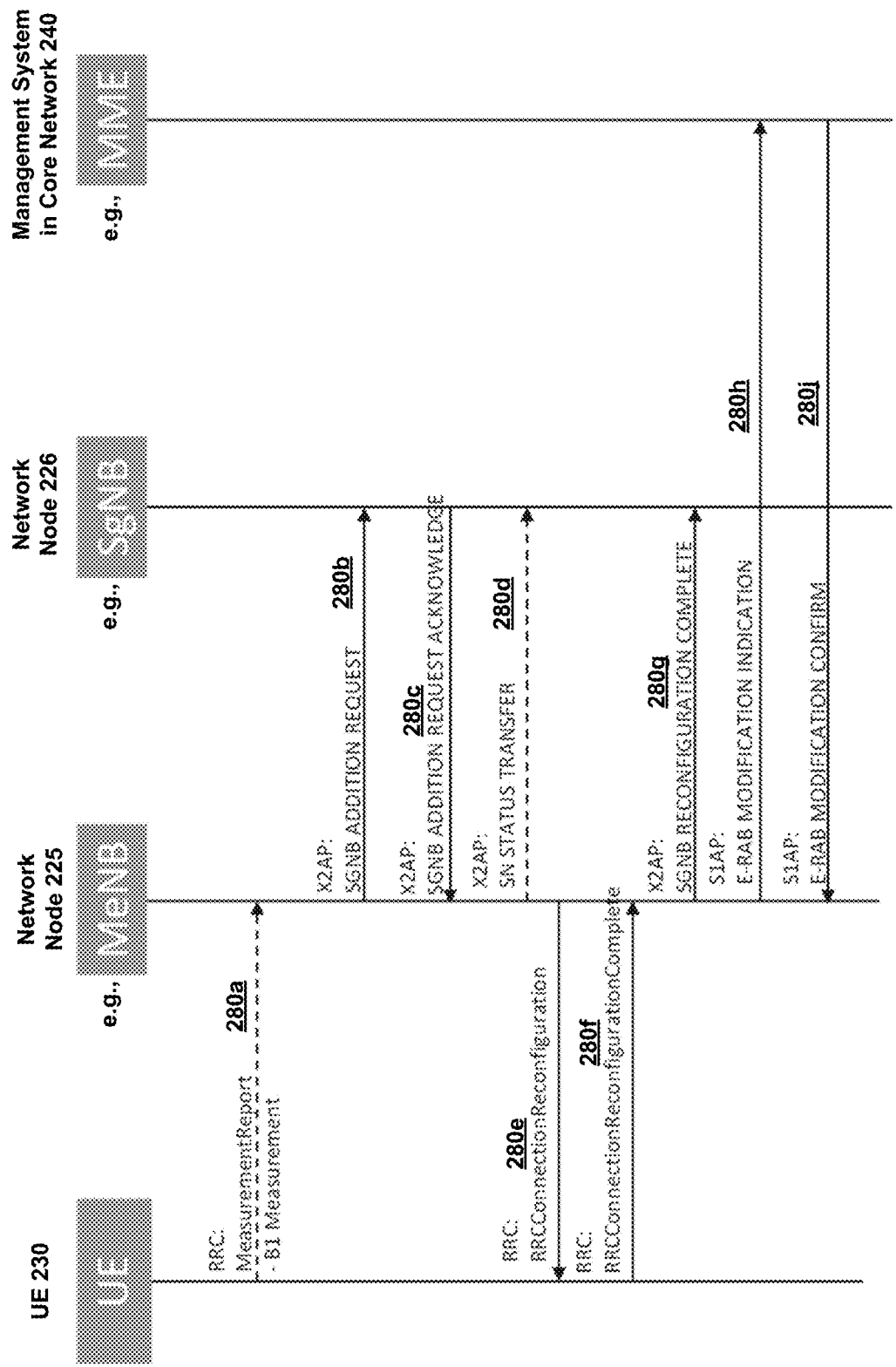
FIG. 2C depicts an illustrative embodiment of a data flow in accordance with various aspects described herein.
Figure 2D:
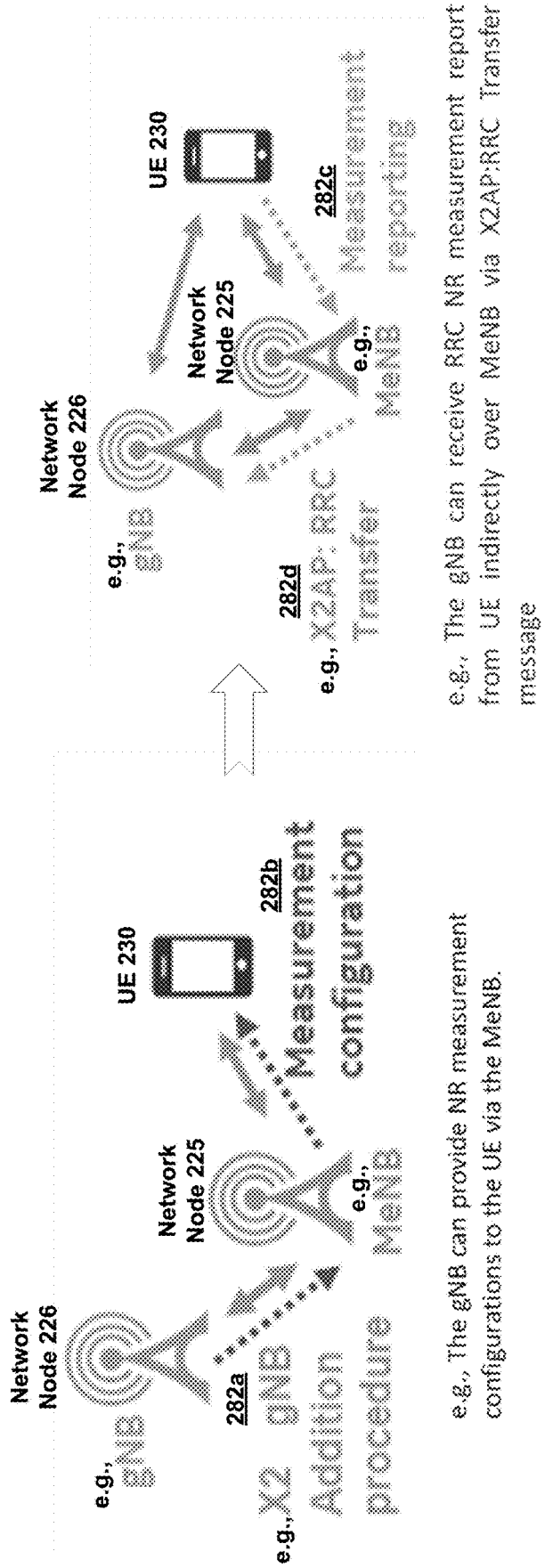
FIG. 2D is a block diagram illustrating an example, non-limiting embodiment of a system functioning within or in conjunction with the system of FIG. 1A, the system of FIG. 1B, and/or the system of FIGS. 2A and 2B in accordance with various aspects described herein.

In various embodiments, the controller device 250 can determine whether dual connectivity is being established for the user equipment 230 via an addition procedure associated with a secondary network node. Referring to FIG. 2C (which depicts an illustrative embodiment of a data flow 280 in accordance with various aspects described herein) and FIG. 2D (which is a block diagram illustrating an example, non-limiting embodiment of a system 282 functioning within or in conjunction with the system 100 of FIG. 1A, the communication network 180 of FIG. 1B, and/or the network system 200 of FIGS. 2A and 2B in accordance with various aspects described herein), assuming that the handover for the user equipment 230, described above with respect to reference number 260, was to the network node 225 (e.g., an MeNB) (i.e., the target network node in the handover, and now functioning as a source network node for the user equipment 230), and in a case where the network system 200 is configured for EN-DC, for example, a network node addition request (for dual connectivity) can be triggered (280*a* of FIG. 2C) by a measurement report (e.g., a B1 measurement report), regarding one or more secondary network nodes (e.g., the network node 226 (e.g., a gNB or NR cell)), provided by the user equipment 230 to the network node 225. In various embodiments, the network node 225 can set measurement gaps as needed for B1 measurements of secondary network nodes. To enable measurement gaps, target neighboring cells may need to have the same overlapping Synchronization Signal Block (SSB) timing configuration (e.g., group of cell-specific signals that the user equipment 230 may use to detect and synchronize with a candidate secondary network node). The network node 225 can select a secondary network node with the strongest signal strength as identified in the measurement report. If an addition procedure (described in more detail below) fails for the selected secondary network node, the network node 225 can attempt an addition procedure for another secondary network node with the next strongest signal strength as identified in the measurement report, and so on.

The network node 225 can provide an addition request (280*b* of FIG. 2C) to the network node 226, which can respond with an acknowledgement (280*c* of FIG. 2C), including, for example, measurement configurations (282*a* of FIG. 2D) for the user equipment 230. The network node 225 can provide status information to the network node 226 (280*d* of FIG. 2C) and reconfiguration information (280*e* of FIG. 2C), including, for example, measurement configurations (and 282*b* of FIG. 2D), to the user equipment 230. The user equipment 230 can respond (280*f* of FIG. 2C), including with measurement report(s) (282*c* of FIG. 2D), to the network node 225, which can, in turn, notify the network node 226 (280*g* of FIG. 2C and 282*d* of FIG. 2D). The network node 225 can inform a management system in the core network 240 (e.g., an MME or the like) of the establishment of dual connectivity (280*h* of FIG. 2C), and the management system can respond with a confirmation (280*j* of FIG. 2C). In various embodiments, the network node 225 may disable B1 measurement reporting for the user equipment 230 upon establishing dual connectivity.

Returning to FIG. 2A, as shown by reference number 266, the controller device 250 can obtain metrics relating to the target network node and/or the secondary network node (e.g., a cell (or cells) corresponding to the target network node and/or the secondary network node). In various embodiments, the controller device 250 can additionally obtain metrics relating to the user equipment 230 (e.g., data similar to the data relating to the user equipment 230 described above with respect to reference number 260*a*). In various embodiments, the metrics can serve as feedback on whether the handover decision (e.g., the handover to the target network node 225) resulted in the user equipment 230 obtaining suitable dual connectivity coverage. In various embodiments, and as shown by reference number 266a, the metrics can include information regarding a rate (e.g., a hit rate or the like) at which user equipment (and/or network node(s)) have selected the target network node for a handover (and/or selected a secondary network node associated with the target network node for dual connectivity), information regarding a duration of connection between user equipment (e.g., user equipment 230) and the secondary network node, information regarding available network resources of the target network node and/or the secondary network node (e.g., information identifying throughput, which can, for example, be used to determine available bandwidth), information regarding capabilities of the target network node and/or the secondary network node (e.g., information identifying support for dual connectivity and/or the like), information regarding a frequency range of the target network node and/or the secondary network node, information regarding a coverage range (and/or an estimated coverage range) of the target network node and/or the secondary network node (e.g., map data that specifies network node location and network coverage range (e.g., in distance) and/or frequency range information, which can be used to determine coverage range), information regarding coverage (in a second band of the network system 200, e.g., an NR band) that overlaps with coverage of the target network node (first band of the network system 200, e.g., an LTE band), information regarding a quantity of network nodes operating in the second band (e.g., NR band) within a coverage range of the target network node, and/or the like.

As shown by reference number 268, the controller device 250 can determine a weighting factor for a pairing of the target network node and the secondary network node based on the metrics and the data relating to the user equipment 230. The weighting factor can indicate a likelihood (or probability) that the target network node and the secondary network node will provide suitable dual connectivity coverage for the user equipment 230. In some embodiments, the controller device 250 can determine a higher weighting factor for the pairing if the metrics indicate that one or more conditions, relating to dual connectivity coverage for the user equipment 230 after the handover, are satisfied. For example, the controller device 250 can determine a higher weighting factor for the pairing if a duration of connection between the user equipment 230 and the secondary network node 226 satisfies a threshold (e.g., is greater than or equal to the threshold or the like), and can determine a lower weighting factor for the pairing if the duration does not satisfy the threshold (e.g., is less or equal to the threshold or the like). As another example, the controller device 250 can determine a higher weighting factor for the pairing if a difference between the available network resources of the secondary network node and the network resource demand of the user equipment 230 (e.g., as identified in the above-described data relating to the user equipment 230) satisfies a threshold (e.g., is greater than or equal to the threshold or the like), and can determine a lower weighting factor for the pairing if the difference does not satisfy the threshold (e.g., is less than or equal to the threshold or the like). As yet another example, the controller device 250 can determine a weighting factor for the pairing based on movement of the user equipment 230 (e.g., a direction of travel and/or a speed of travel of the user equipment 230) and/or a frequency range of the secondary network node—e.g., a higher weighting factor if the frequency range corresponds to a coverage range that extends beyond a future, or predicted, position of the user equipment 230 (e.g., predicted based on a trajectory analysis using a current location of the user equipment 230, the direction of travel and/or the speed of travel of the user equipment 230, historical location information relating to the user equipment 230 and/or other user equipment, behavior information relating to the user equipment 230 and/or other user equipment, and so on) by a threshold distance, and a lower weighting factor if the frequency range corresponds to a coverage range that does not extend beyond the predicted position of the user equipment 230 by the threshold distance. Continuing the example, in a case where the secondary network node 226 is operative in the MW frequency range (which provides a smaller coverage area), and where the controller device 250 determines that the user equipment is not moving, the controller device 250 can determine a higher weighting factor for the pairing of the target network node 225 and the secondary network node 226, and can determine a lower weighting factor if the user equipment 230 is moving away from the secondary network node 226 at a high speed.

It is to be understood and appreciated that the controller device 250 can use any of the above-described metrics and/or any information item in the data relating to the user equipment 230 to determine a weighting factor for a pairing of a target network node and a secondary network node.

As different user equipment may have different network resource demands and may travel in different directions and/or at different speeds, and as network resource availability of secondary network nodes may change as user equipment communicatively couple therewith and communicatively decouple therefrom, in various embodiments, the controller device 250 can determine, for different user equipment, different weighting factors for a given pairing of a network node (e.g., the network node 225) and an associated secondary network node (e.g., the network node 226). In various embodiments, the controller device 250 can dynamically update or adjust a weighting factor for a pairing (such that each pairing is associated with only a single weighting factor at a time), or alternatively, associate multiple, adjustable weighting factors (e.g., determined for different user equipment) with a pairing.

As shown by reference number 270, the controller device 250 can cause the source network node 205 to define the pairing of the target network node and the secondary network node in a neighbor list, and associate the pairing with the weighting factor. The weighting factor can enable the source network node 205 (and/or the controller device 250) to determine, in subsequent handovers for a user equipment (e.g., the user equipment 230, the user equipment 235 of FIG. 2B, or other user equipment), whether the target network node is an optimal handover candidate for that user equipment. Referring to FIG. 2B, and as shown in an example enhanced neighbor list 271, a network node (e.g., the network node 225) can associate, in the neighbor list, pairings of network nodes with corresponding weighting factors—e.g., a weighting factor of '4' for a pairing of eNB2 and gNB1, a weighting factor of '10' for a pairing of eNB2 and gNB2, a weighting factor of '3' for a pairing of eNB4 and gNB2, no weighting factor for a pairing of eNB3 and gNB1 (e.g., due to a restriction or blacklisting of relations between eNB3 and gNB1), and so on. In various embodiments, the weighting factors can be determined by the enhanced ANR functionality of the controller device 250, described above with respect to FIG. 2A, in connection with handovers performed by the network node 205 for one or more user equipment (e.g., the user equipment 230 and/or other user equipment). In some embodiments, the controller device 250 and/or a network node can count each time that a neighboring network node (or associated pair) is selected for a handover, derive corresponding hit rates, and associate the hit rates with network node pairs in a neighbor list (e.g., as shown in example enhanced neighbor list 271).

Still referring to FIG. 2B, and as shown by reference number 272, the controller device 250 can obtain data relating to the user equipment 235. In various embodiments, the controller device 250 can obtain the data prior to a handover being performed for the user equipment 235. For example, the network node 205 may be serving the user equipment 235 as a source network node, where the user equipment 235 may desire a handover to a target network node (e.g., one of network nodes 215 and 225). Continuing with the example, the controller device 250 can obtain data relating to the user equipment 235 prior to the handover from the source network node 205 to the target network node. In various embodiments, the data relating to the user equipment 235 can be similar to, or the same as, the data relating to the user equipment 230 described above with respect to reference number 260a of FIG. 2A. In some embodiments, the controller device 250 can additionally, or alternatively, obtain the data relating to the user equipment 235 during, or after, a handover.

As shown by reference number 273, the controller device 250 can control selection of a target network node for the handover based on the data relating to the user equipment 235, metrics relating to network nodes (e.g., metrics that are the same as or similar to those described above with respect to FIG. 2A, obtained by the controller device 250 in connection with one or more user equipment, such as the user equipment 230), weighting factors, and/or measurement report(s). In various embodiments, the weighting factors can correspond to pairings of network nodes and associated secondary network nodes, such as, for example, those identified, or stored, in the example enhanced neighbor list 271. In various embodiments, the measurement reports can include B1 measurement reports, or the like, provided by the user equipment 235 to the network node 205. In some embodiments, the controller device 250 can control the selection of the target network node by instructing, or otherwise causing, the network node 205 to perform the selection. In alternate embodiments, the network node 205 can independently select a target network node for the handover, or select a target network node based on a request by the user equipment 235.

In various embodiments, the controller device 250 can control selection of a target network node based on the weighting factors, but not based on the data relating to the user equipment 235, the metrics relating to network nodes, or measurement report(s). For example, the controller device 250 can cause the network node 205 to select a target network node based simply on the highest weighting factor in the neighbor list (e.g., the network node 215 (e.g., eNB2) based on the weighting factor of '10' associated with the pairing of the network node 215 (e.g., eNB2) and the secondary network node 216 (e.g., gNB2) in the example enhanced neighbor list 271). In various embodiments, the controller device 250 can additionally control selection of a secondary network node (e.g., the network node 216) for the user equipment 235 (e.g., by providing control signals to the target network node and/or the secondary network node) to ensure that, after the handover to the target network node, a particular secondary network node (e.g., the network node 216) is selected to provide dual connectivity coverage for the user equipment 235.

In some embodiments, the controller device 250 can control selection of a target network node based on the weighting factors, the data relating to the user equipment 235, and metrics relating to network nodes, but not based on measurement report(s). For example, the controller device 250 can cause the network node 205 to select a target network node that is associated with a weighting factor that satisfies a threshold (e.g., that is greater than or equal to a threshold or the like) and where data relating to the user equipment 235 (e.g., information regarding movement of the user equipment 235 and/or a future location of the user equipment 235 (e.g., determined based on a trajectory analysis similar to that described above with respect to reference number 268 of FIG. 2A), information regarding network resource demand of the user equipment 235, and/or the like) and metrics relating to network nodes suggest, or otherwise indicate, that the user equipment 235 will likely obtain suitable dual connectivity coverage from such network nodes. As an example, this can include an indication that a candidate target network node and an associated secondary network node have available network resources that satisfy respective thresholds associated with a network resource demand of the user equipment 235, that a candidate target network node and an associated secondary network node have respective coverage ranges that extend beyond a future, or predicted, position of the user equipment 235 (e.g., predicted based on a trajectory analysis using a current location of the user equipment 235, the direction of travel and/or the speed of travel of the user equipment 235, historical location information relating to the user equipment 235 and/or other user equipment, behavior information relating to the user equipment 235 and/or other user equipment, and so on) by a threshold distance, and/or the like.

In various embodiments, the controller device 250 can adjust, or recalculate, a weighting factor for some or all pairings of candidate target network nodes and associated secondary network nodes based on analyses of the data relating to the user equipment 235 and the abovementioned metrics relating to network nodes, and control the selection of a target network node based on the adjusted weighting factor(s). In this way, the controller device 250 can take a current user equipment's requirements and/or conditions and/or current metrics relating to network node pairs into consideration in the target network node selection process, which current (or existing) weighting factors for such network node pairs may not account for.

In some embodiments, the controller device 250 can control selection of a target network node based on the weighting factors, the data relating to the user equipment 235, the metrics relating to network nodes, and the measurement report(s). For example, the controller device 250 can cause the network node 205 to select a target node in a manner similar to that described above in the foregoing example (concerning weighting factors, the data relating to the user equipment 235, and the metrics relating to network nodes), and additionally based on signal strength(s) in measurement report(s) that satisfy one or more threshold strengths (e.g., greater than or equal to the threshold strength (s) or the like).

It is to be understood and appreciated that the controller device 250 can control selection of the target network node based on any combination of the data relating to the user equipment 235, metrics relating to network nodes, weighting factors, and/or measurement report(s), including other data relating to the network system 200, such as other metrics associated with other devices of the network system 200, etc.

As shown by reference number 274, the controller device 250 can monitor an activity between the user equipment 235 and the target network node and/or an associated secondary network node (e.g., after a handover is performed), and, as shown by reference number 275, the controller device 250 can obtain metrics relating to the target network node and/or the secondary network node (e.g., a cell (or cells) corresponding to the target network node and the secondary network node). In various embodiments, the controller device 250 can monitor the activity and obtain the metrics in a manner similar to that described above with respect to reference numbers 262, 264, and/or 266 of FIG. 2A. In some embodiments, the controller device 250 can additionally obtain metrics relating to the user equipment 235 (e.g., data similar to the data relating to the user equipment 235 described above with respect to reference number 272).

As shown by reference number 276, the controller device 250 can adjust one or more weighting factors based on the obtained metrics. In various embodiments, the controller device 250 can cause the source network node 205 to update the neighbor list with the adjusted weighting factor(s).

As an example, in a case where the controller device 250 caused (e.g., at step 273) the source network node 205 to select the target network node 225 for the handover for the user equipment 235, based on a weighting factor of '9' corresponding to a pairing of the target network node 225 and an associated secondary network node 226, and the controller device 250 obtains metrics (e.g., at step 275) indicating that available network resources of the secondary network node 226 are insufficient to meet the network resource demand of the user equipment 235 (e.g., a difference between the available network resources of the secondary network node 226 and the network resource demand of the user equipment 235 satisfies a threshold (e.g., is less than or equal to the threshold or the like)), the controller device 250 can adjust the weighting factor, such as by lowering the weighting factor from '9' to '8', '5', or the like. In this way, the controller device 250 can dynamically adjust or update weighting factors based on changing network conditions and/or user equipment-related requirements or conditions, which enables the controller device 250 and/or a source network node (e.g., the source network node 205) to select handover target network nodes that can provide optimal dual connectivity coverage to user equipment.

In various embodiments, the controller device 250 can adjust a weighting factor responsive to one or more of a variety of conditions being satisfied, such as a handover being performed, a change in any of the above-described hit rates that satisfies a threshold (e.g., is greater than or equal to the threshold, is less than or equal to the threshold, or the like), based on a quantity of user equipment connected to a target network node satisfying a threshold (e.g., is greater than or equal to the threshold, is less than or equal to the threshold, or the like), etc.

It is to be understood and appreciated that the controller device 250 can perform the actions described above with respect to reference numbers 260-276 in connection with multiple user equipment, multiple source network nodes, and multiple pairings of network nodes and associated secondary network nodes. Furthermore, although each of FIGS. 2A and 2B shows a single controller device 250, a single user equipment 230 (or 235), a single core network 240, and several network nodes (i.e., network nodes 205, 206, 215, 216, 225, and 226), in practice, there can be hundreds, thousands, millions, billions, etc. of such devices, equipment, networks, and network nodes. In this way, example network system 200 can coordinate, or operate in conjunction with, a set of components and/or operate on data sets that cannot be managed manually or objectively by a human actor.

It is still further to be understood and appreciated that the quantity and arrangement of nodes, devices, and networks shown in each of FIGS. 2A and 2B are provided as an example. In practice, there may be additional nodes, devices, and/or networks, fewer nodes, devices, and/or networks, different nodes, devices, and/or networks, or differently arranged nodes, devices, and/or networks than those shown in each of FIGS. 2A and 2B. For example, the network system 200 can include more or fewer network nodes 205, network nodes 206, network nodes 215, network nodes 216, network nodes 225, network nodes 226, user equipment 230, user equipment 235, core networks 240, controller devices 250, etc. Furthermore, two or more nodes or devices shown in each of FIGS. 2A and 2B may be implemented within a single node or device, or a single node or device shown in each of FIGS. 2A and 2B may be implemented as multiple, distributed nodes or devices. Additionally, or alternatively, a set of nodes or devices (e.g., one or more nodes or devices) of the network system 200 may perform one or more functions described as being performed by another set of nodes or devices of the network system 200.

Figure 2E:
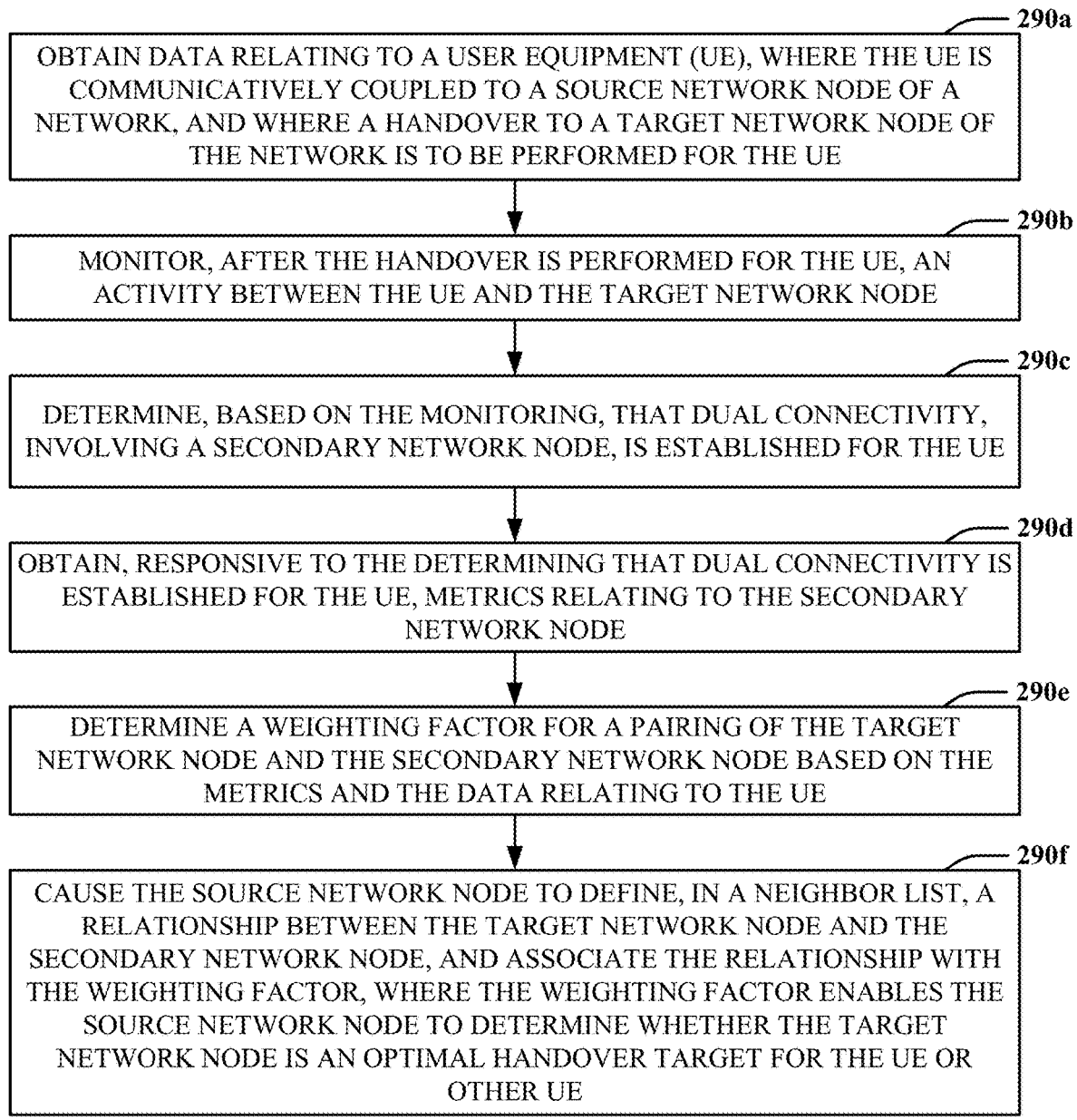
FIG. 2E depicts an illustrative embodiment of a method in accordance with various aspects described herein.

FIG. 2E depicts an illustrative embodiment of a method 290 in accordance with various aspects described herein. In some embodiments, one or more process blocks of FIG. 2E can be performed by a controller device, such as the controller device 250. In some embodiments, one or more process blocks of FIG. 2E may be performed by another device or a group of devices separate from or including the controller device 250, such as the network node 205, the network node 206, the network node 215, the network node 216, the network node 225, the network node 226, the core network 240, the user equipment 230, and/or the user equipment 235.

At 290*a*, the method can include obtaining data relating to a user equipment, where the user equipment is communicatively coupled to a source network node of a network, and where a handover to a target network node of the network is to be performed for the user equipment. For example, the controller device 250 can obtain data relating to a user equipment in a manner similar to that described above with respect to the network system 200 of FIGS. 2A and/or 2B, where the user equipment is communicatively coupled to a source network node of a network, and where a handover to a target network node of the network is to be performed for the user equipment.

At 290*b*, the method can include monitoring, after the handover is performed for the user equipment, an activity between the user equipment and the target network node. For example, the controller device 250 can monitor, after the handover is performed for the user equipment, an activity between the user equipment and the target network node in a manner similar to that described above with respect to the network system 200 of FIGS. 2A and/or 2B.

At 290*c*, the method can include determining, based on the monitoring, that dual connectivity, involving a secondary network node, is established for the user equipment. For example, the controller device 250 can determine, based on the monitoring, that dual connectivity, involving a secondary network node, is established for the user equipment in a manner similar to that described above with respect to the network system 200 of FIGS. 2A and/or 2B.

At 290*d*, the method can include obtaining, responsive to the determining that dual connectivity is established for the user equipment, metrics relating to the secondary network node. For example, the controller device 250 can obtain, responsive to determining that dual connectivity is established for the user equipment, metrics relating to the secondary network node in a manner similar to that described above with respect to the network system 200 of FIGS. 2A and/or 2B.

At 290*e*, the method can include determining a weighting factor for a pairing of the target network node and the secondary network node based on the metrics and the data relating to the user equipment. For example, the controller device 250 can determine a weighting factor for a pairing of the target network node and the secondary network node based on the metrics and the data relating to the user equipment in a manner similar to that described above with respect to the network system 200 of FIGS. 2A and/or 2B.

At 290*f*, the method can include causing the source network node to define, in a neighbor list, a relationship between the target network node and the secondary network node, and associate the relationship with the weighting factor, where the weighting factor enables the source network node to determine whether the target network node is an optimal handover target for the user equipment or other user equipment. For example, the controller device 250 can cause the source network node to define, in a neighbor list, a relationship between the target network node and the secondary network node, and associate the relationship with the weighting factor in a manner similar to that described above with respect to the network system 200 of FIGS. 2A and/or 2B, where the weighting factor enables the source network node to determine whether the target network node is an optimal handover target for the user equipment or other user equipment.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
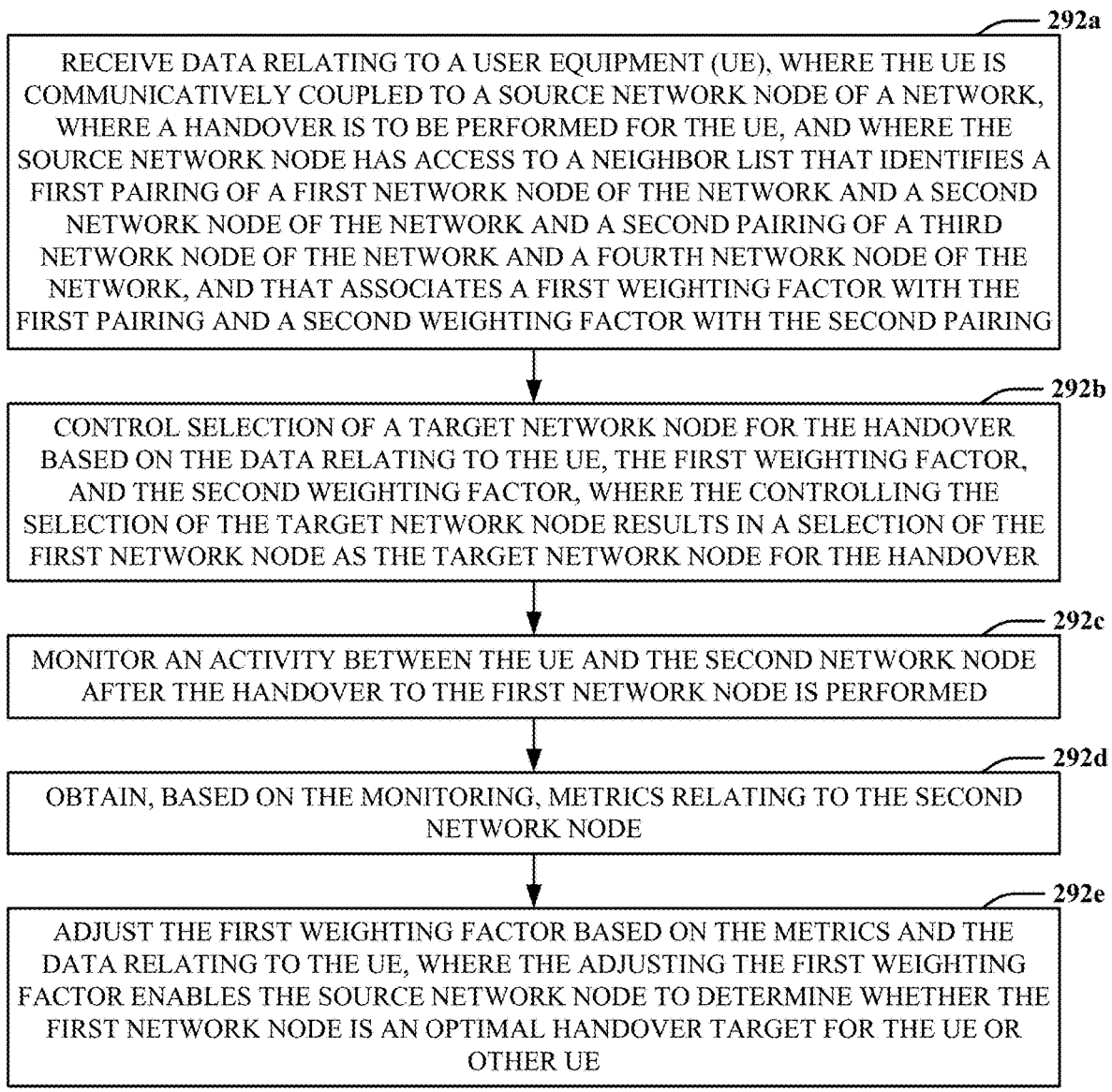
FIG. 2F depicts an illustrative embodiment of a method in accordance with various aspects described herein.

FIG. 2F depicts an illustrative embodiment of a method 292 in accordance with various aspects described herein. In some embodiments, one or more process blocks of FIG. 2F can be performed by a controller device, such as the controller device 250. In some embodiments, one or more process blocks of FIG. 2F may be performed by another device or a group of devices separate from or including the controller device 250, such as the network node 205, the network node 206, the network node 215, the network node 216, the network node 225, the network node 226, the core network 240, the user equipment 230, and/or the user equipment 235.

At 292*a*, the method can include receiving data relating to a user equipment, where the user equipment is communicatively coupled to a source network node of a network, where a handover is to be performed for the user equipment, and where the source network node has access to a neighbor list that identifies a first pairing of a first network node of the network and a second network node of the network and a second pairing of a third network node of the network and a fourth network node of the network, and that associates a first weighting factor with the first pairing and a second weighting factor with the second pairing. For example, the controller device 250 can receive data relating to a user equipment in a manner similar to that described above with respect to the network system 200 of FIGS. 2A and/or 2B, where the user equipment is communicatively coupled to a source network node of a network, where a handover is to be performed for the user equipment, and where the source network node has access to a neighbor list that identifies a first pairing of a first network node of the network and a second network node of the network and a second pairing of a third network node of the network and a fourth network node of the network, and that associates a first weighting factor with the first pairing and a second weighting factor with the second pairing.

At 292*b*, the method can include controlling selection of a target network node for the handover based on the data relating to the user equipment, the first weighting factor, and the second weighting factor, where the controlling the selection of the target network node results in a selection of the first network node as the target network node for the handover. For example, the controller device 250 can control selection of a target network node for the handover based on the data relating to the user equipment, the first weighting factor, and the second weighting factor in a manner similar to that described above with respect to the network system 200 of FIGS. 2A and/or 2B, where the controlling the selection of the target network node results in a selection of the first network node as the target network node for the handover.

At 292*c*, the method can include monitoring an activity between the user equipment and the second network node after the handover to the first network node is performed. For example, the controller device 250 can monitor an activity between the user equipment and the second network node after the handover to the first network node is performed in a manner similar to that described above with respect to the network system 200 of FIGS. 2A and/or 2B.

At 292*d*, the method can include obtaining, based on the monitoring, metrics relating to the second network node. For example, the controller device 250 can obtain, based on the monitoring, metrics relating to the second network node in a manner similar to that described above with respect to the network system 200 of FIGS. 2A and/or 2B.

At 292*e*, the method can include adjusting the first weighting factor based on the metrics and the data relating to the user equipment, where the adjusting the first weighting factor enables the source network node to determine whether the first network node is an optimal handover target for the user equipment or other user equipment. For example, the controller device 250 can adjust the first weighting factor based on the metrics and the data relating to the user equipment in a manner similar to that described above with respect to the network system 200 of FIGS. 2A and/or 2B, where the adjusting the first weighting factor enables the source network node to determine whether the first network node is an optimal handover target for the user equipment or other user equipment.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of communication network 180, the subsystems and functions of system 200, the data flow 280, the subsystems and functions of system 282, method 290, and method 292 presented in FIGS. 1A, 1B, and 2A-2F. For example, virtualized communication network 300 can facilitate in whole or in part enabling selection of a handover target network node for a user equipment, that is likely to result in suitable dual connectivity coverage for the user equipment, based on data relating to the user equipment (e.g., movement of the user equipment, network resource demand of the user equipment, and/or the like) and metrics relating to network node pairs (e.g., pairs that each includes an LTE-based network node and an NR-based network node) and network node capabilities (e.g., dual connectivity support, coverage range(s), operative frequency range(s), and/or the like).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
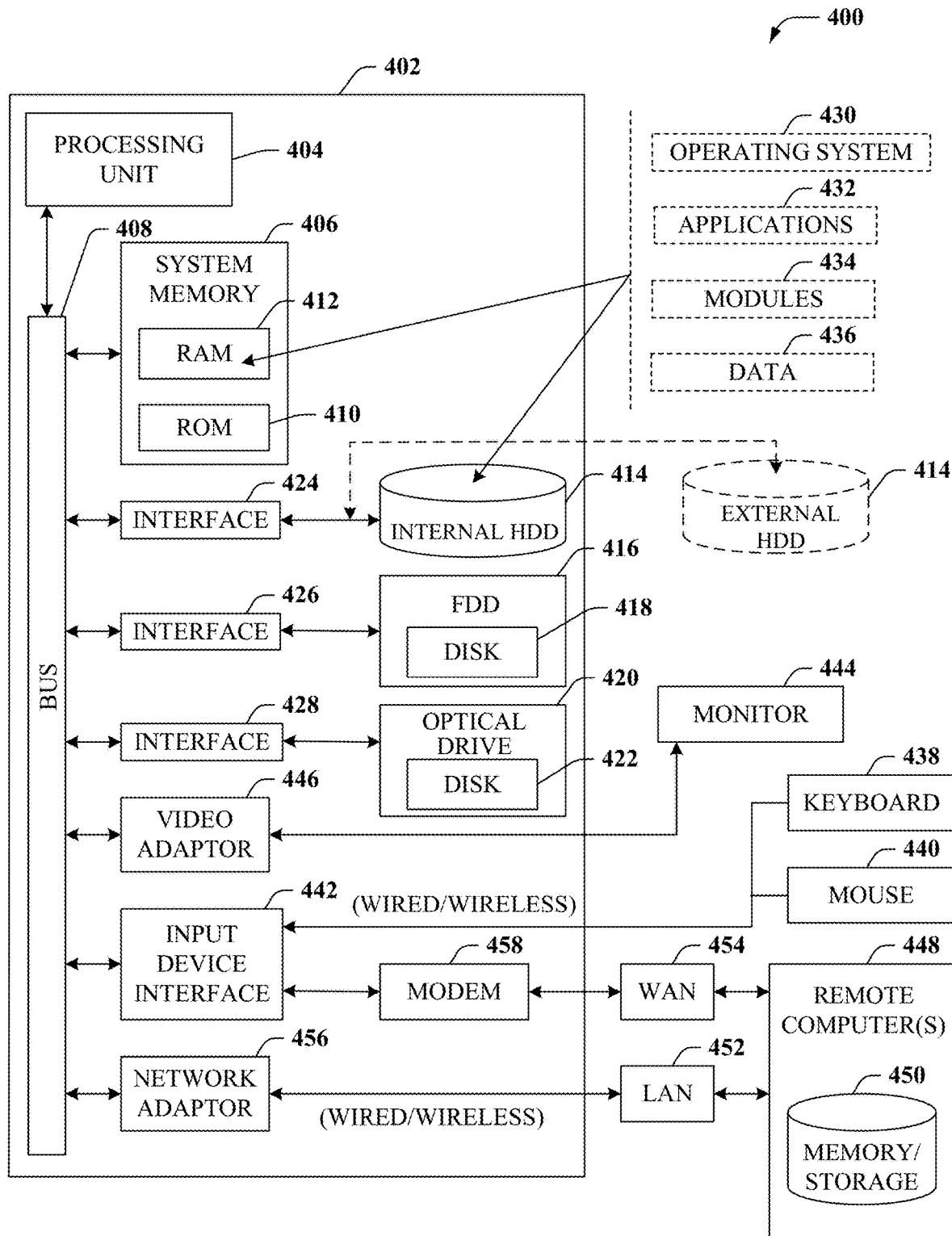
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part enabling selection of a handover target network node for a user equipment, that is likely to result in suitable dual connectivity coverage for the user equipment, based on data relating to the user equipment (e.g., movement of the user equipment, network resource demand of the user equipment, and/or the like) and metrics relating to network node pairs (e.g., pairs that each includes an LTE-based network node and an NR-based network node) and network node capabilities (e.g., dual connectivity support, coverage range(s), operative frequency range(s), and/or the like).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communication network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communication network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
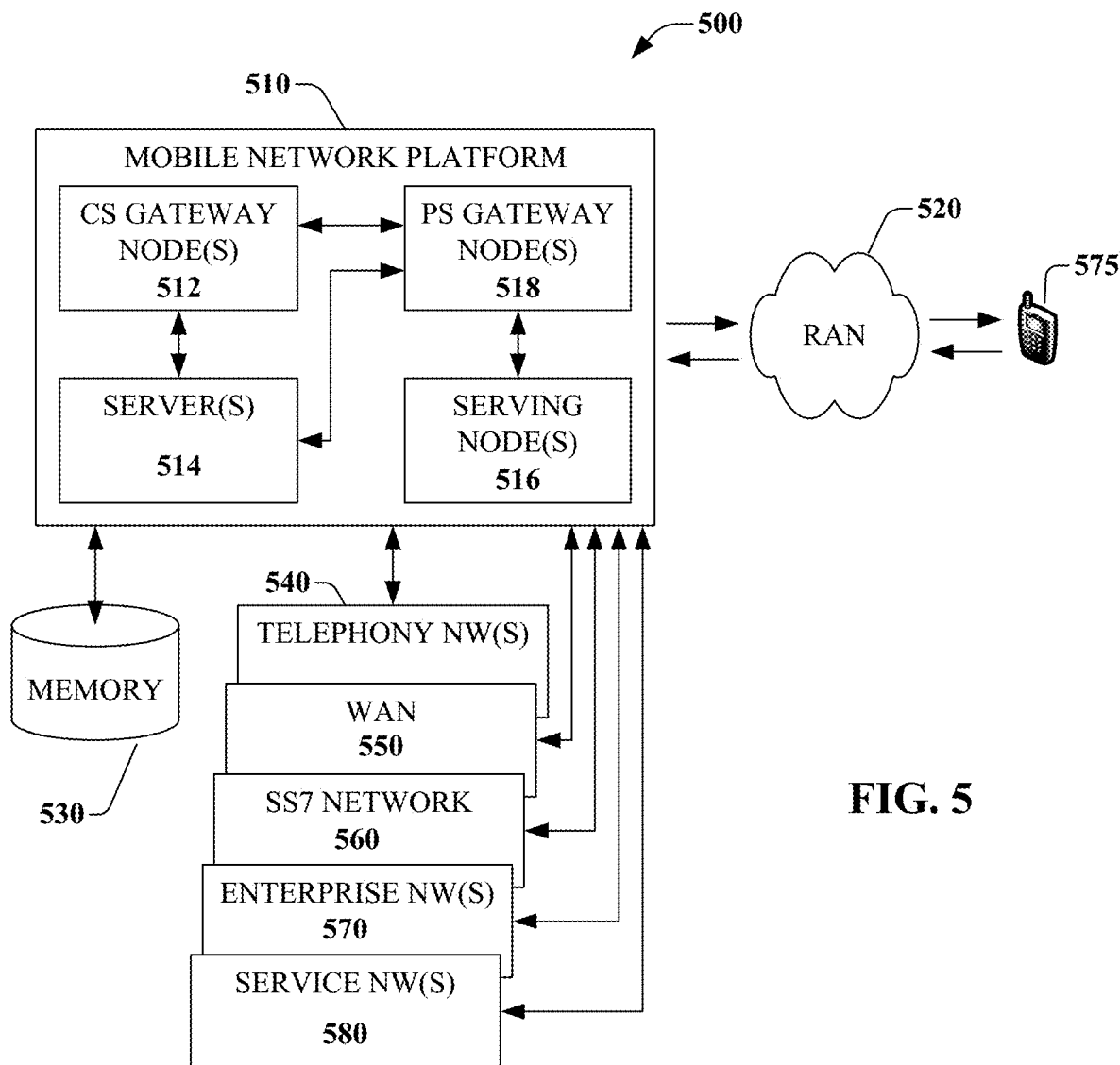
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part enabling selection of a handover target network node for a user equipment, that is likely to result in suitable dual connectivity coverage for the user equipment, based on data relating to the user equipment (e.g., movement of the user equipment, network resource demand of the user equipment, and/or the like) and metrics relating to network node pairs (e.g., pairs that each includes an LTE-based network node and an NR-based network node) and network node capabilities (e.g., dual connectivity support, coverage range(s), operative frequency range(s), and/or the like). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1 that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
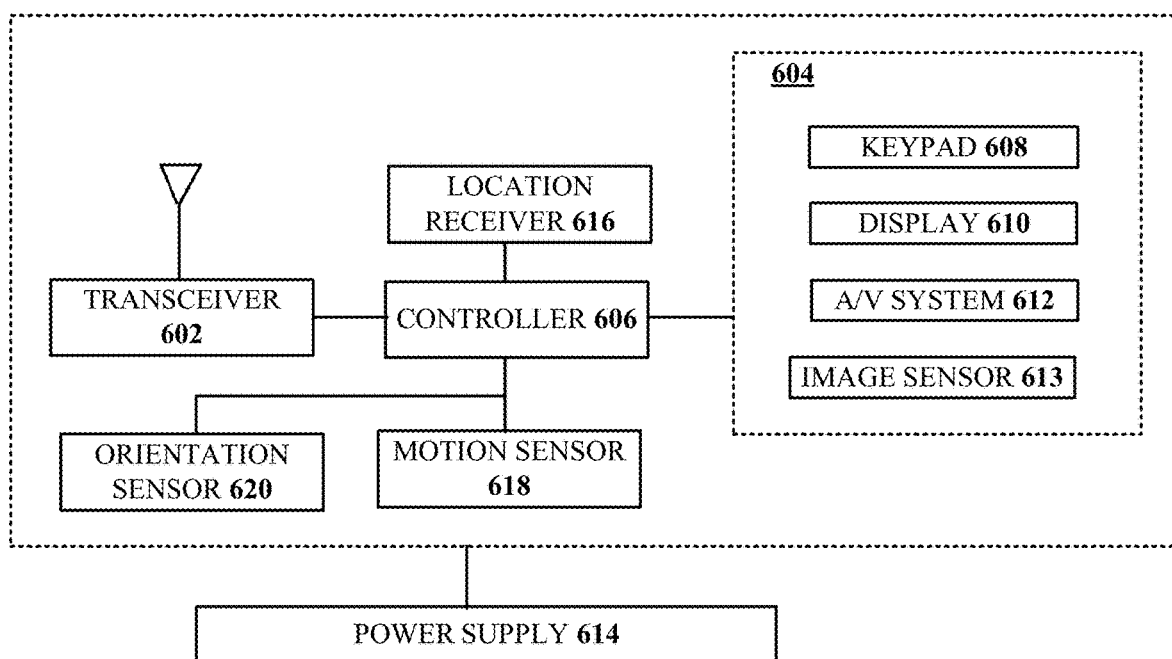
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communication network 125. For example, computing device 600 can facilitate in whole or in part enabling selection of a handover target network node for a user equipment, that is likely to result in suitable dual connectivity coverage for the user equipment, based on data relating to the user equipment (e.g., movement of the user equipment, network resource demand of the user equipment, and/or the like) and metrics relating to network node pairs (e.g., pairs that each includes an LTE-based network node and an NR-based network node) and network node capabilities (e.g., dual connectivity support, coverage range(s), operative frequency range(s), and/or the like).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to pre-determined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining data relating to a user equipment, wherein the user equipment is communicatively coupled to a source network node of a network, and wherein a handover to a target network node of the network is to be performed for the user equipment;
monitoring, after the handover is performed for the user equipment, an activity between the user equipment and the target network node;
determining, based on the monitoring, whether dual connectivity, involving a secondary network node, is established for the user equipment;
obtaining, responsive to determining that dual connectivity is established for the user equipment, metrics relating to the secondary network node;
determining a weighting factor for a pairing of the target network node and the secondary network node based on the metrics and the data relating to the user equipment; and
causing the source network node to define, in a neighbor list, a relationship between the target network node and the secondary network node, and associate the relationship with the weighting factor, wherein the weighting factor enables the source network node to determine whether the target network node is an optimal handover target for the user equipment or other user equipment.

2. The device of claim 1, wherein the determining whether dual connectivity is established for the user equipment comprises determining whether dual connectivity is established for the user equipment via an addition procedure associated with the secondary network node.

3. The device of claim 1, wherein the data relating to the user equipment comprises information regarding network resource demand of the user equipment, information regarding a direction of travel of the user equipment, information regarding a speed of travel of the user equipment, or a combination thereof.

4. The device of claim 1, wherein the metrics comprise information regarding a duration of connection between a user equipment and the secondary network node, information regarding available network resources of the secondary network node, information regarding an operative frequency range of the secondary network node, information regarding a coverage range of the secondary network node, or a combination thereof.

5. The device of claim 1, wherein the target network node employs a first radio access technology, and wherein the secondary network node employs a second radio access technology different from the first radio access technology.

6. The device of claim 1, wherein the network is configured for E-UTRAN New Radio (NR) Dual Connectivity (EN-DC).

7. The device of claim 1, wherein the determining the weighting factor comprises determining whether the metrics indicate that a condition, relating to dual connectivity coverage for the user equipment, is satisfied.

8. The device of claim 7, wherein the condition relates to a duration of a connection between the user equipment and the secondary network node.

9. The device of claim 7, wherein the data relating to the user equipment includes information regarding a network resource demand of the user equipment, and wherein the condition relates to a difference between available network resources of the secondary network node and the network resource demand of the user equipment.

10. The device of claim 7, wherein the data relating to the user equipment includes information usable to identify a predicted location of the user equipment, and wherein the condition relates to a coverage range of the secondary network node relative to the predicted location of the user equipment.

11. A non-transitory machine-readable storage device, comprising executable instructions that, when executed by a processing system including a processor, facilitate performance of operations comprising:
receiving data relating to a user equipment, wherein the user equipment is communicatively coupled to a source network node of a network, wherein a handover is to be performed for the user equipment, and wherein the source network node has access to a neighbor list that identifies a first pairing of a first network node of the network and a second network node of the network and a second pairing of a third network node of the network and a fourth network node of the network, and that associates a first weighting factor with the first pairing and a second weighting factor with the second pairing;
controlling selection of a target network node for the handover based on the data relating to the user equipment, the first weighting factor, and the second weighting factor, wherein the controlling the selection of the target network node results in a selection of the first network node as the target network node for the handover;
monitoring an activity between the user equipment and the second network node after the handover to the first network node is performed;
obtaining, based on the monitoring, metrics relating to the second network node; and
adjusting the first weighting factor based on the metrics and the data relating to the user equipment, wherein the adjusting the first weighting factor enables the source network node to determine whether the first network node is an optimal handover target for the user equipment or other user equipment.

12. The non-transitory machine-readable storage device of claim 11, wherein the monitoring comprises monitoring for dual connectivity, involving the second network node, to be established for the user equipment.

13. The non-transitory machine-readable storage device of claim 11, wherein the first network node and the third network node each employs a first radio access technology, and wherein the second network node and the fourth network node each employs a second radio access technology different from the first radio access technology.

14. The non-transitory machine-readable storage device of claim 11, wherein the first weighting factor indicates a probability that the first network node and the second network node will provide suitable dual connectivity coverage, wherein the second weighting factor indicates a probability that the third network node and the fourth network node will provide suitable dual connectivity coverage, and wherein the first weighting factor is higher than the second weighting factor.

15. The non-transitory machine-readable storage device of claim 11, wherein the controlling the selection of the target network node comprises controlling the source network node to select the target network node.

16. A method, comprising:
- obtaining, by a processing system including a processor, and from a user equipment, data relating to the user equipment, wherein the processing system is included in a source network node of a network, wherein the user equipment is communicatively coupled to the source network node;
- accessing, by the processing system, a neighbor list that identifies a first pairing of a first network node of the network and a second network node of the network and a second pairing of a third network node of the network and a fourth network node of the network, and that associates a first weighting factor with the first pairing and a second weighting factor with the second pairing;
- selecting, by the processing system, one of the first network node and the third network node as a target network node in a handover for the user equipment based on the data relating to the user equipment, the first weighting factor, and the second weighting factor; and
- causing the handover to be effected for the user equipment responsive to the selecting the one of the first network node and the third network node as the target network node.

17. The method of claim 16, wherein the first weighting factor and the second weighting factor are determined by a controller device that is separate from the source network node.

18. The method of claim 16, wherein the first network node and the third network node each employs a first radio access technology, and wherein the second network node and the fourth network node each employs a second radio access technology different from the first radio access technology.

19. The method of claim 16, wherein the first weighting factor indicates a probability that the first network node and the second network node will provide suitable dual connectivity coverage, wherein the second weighting factor indicates a probability that the third network node and the fourth network node will provide suitable dual connectivity coverage.

20. The method of claim 16, wherein the data relating to the user equipment comprises information regarding a network resource demand of the user equipment, information regarding a direction of travel of the user equipment, information regarding a speed of travel of the user equipment, or a combination thereof.

* * * * *